United States Patent [19]

Hollenbaugh, Sr.

[11] Patent Number: 5,083,827
[45] Date of Patent: Jan. 28, 1992

[54] INCREMENTALLY ADJUSTABLE AND REMOVABLE CARGO TRAY

[75] Inventor: Robert A. Hollenbaugh, Sr., Erie, Pa.

[73] Assignee: Ricky R. York, Erie, Pa.

[21] Appl. No.: 593,470

[22] Filed: Oct. 2, 1990

Related U.S. Application Data

[63] Continuation-in-part of Ser. No. 438,199, Nov. 20, 1989, abandoned, which is a continuation of Ser. No. 274,393, Nov. 21, 1988, abandoned, which is a continuation-in-part of Ser. No. 60,639, Jun. 11, 1987, abandoned.

[51] Int. Cl.⁵ .................................................. B60R 11/00
[52] U.S. Cl. .................................. 296/37.1; 296/37.16; 220/4.08
[58] Field of Search ............... 296/39.1, 39.2, 76, 296/37.1, 37.16; 224/42.42 R; 220/4.03, 8

[56] References Cited

U.S. PATENT DOCUMENTS

| | | | |
|---|---|---|---|
| 729,078 | 5/1903 | Maxwell | 220/8 |
| 818,257 | 4/1906 | Kennedy | 296/39.1 |
| 876,235 | 1/1908 | Quackenboss | 220/8 |
| 1,750,575 | 3/1930 | Cubberley | 220/8 |
| 2,898,146 | 8/1959 | Yudenfreund | 296/39.1 |
| 4,564,118 | 1/1986 | Heyer et al. | 220/8 |

FOREIGN PATENT DOCUMENTS 2118109 10/1983 United Kingdom ............... 296/39.1

Primary Examiner—Robert R. Song
Attorney, Agent, or Firm—Wayne L. Lovercheck; Charles L. Lovercheck

[57] ABSTRACT

The cargo tray of the invention is used in combination with a vehicle having a cargo portion. In a preferred embodiment of the invention, a first tray member is incrementally adjustable in a second tray member to adjust the size of the cargo carrying area. In the embodiment of the invention adapted for automobile trunks, the cargo tray includes a first tray member with engaging members and a second tray member with engagable members so that the first and second tray members can be held in position relative to each other to support the cargo away from the sides of the cargo area of the vehicle.

10 Claims, 3 Drawing Sheets

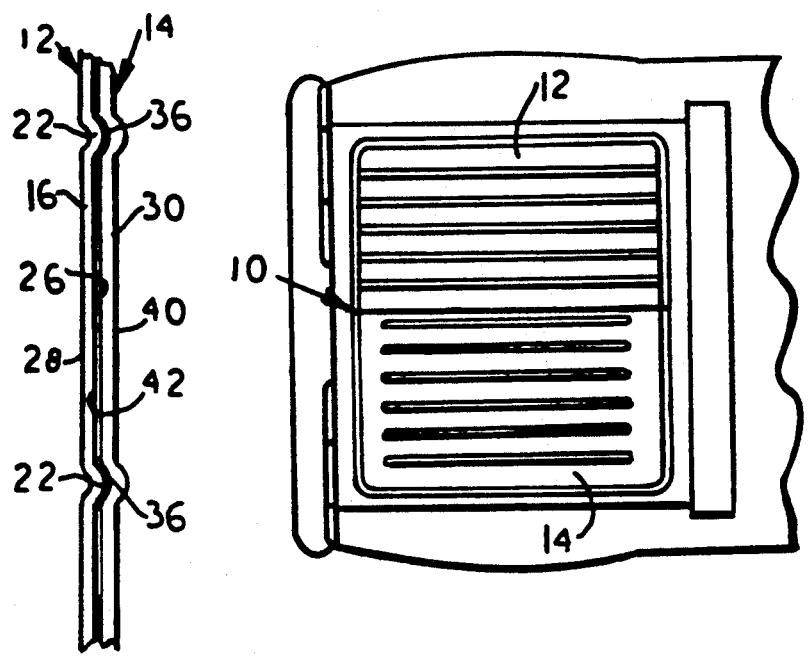
FIG. 10
FIG. 5
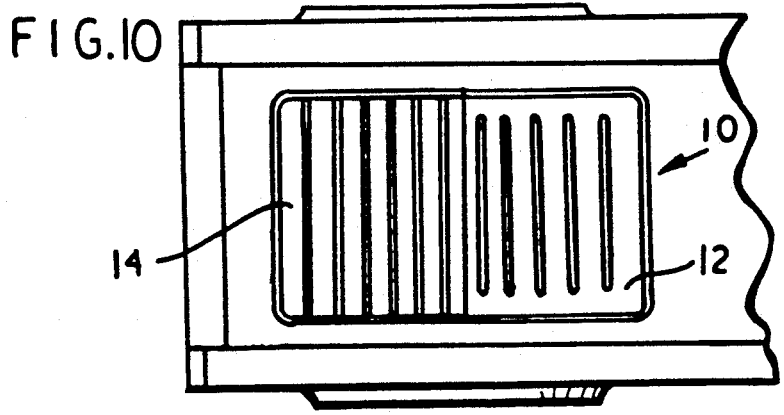
FIG. 6
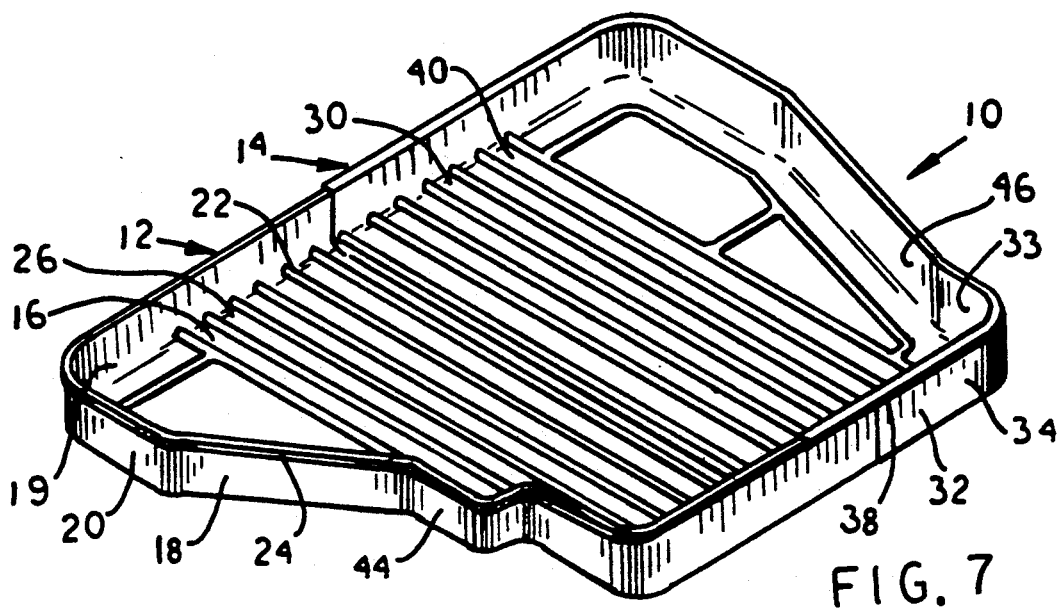
FIG. 7

INCREMENTALLY ADJUSTABLE AND REMOVABLE CARGO TRAY

REFERENCE TO PRIOR ART

This is a Continuation-In-Part of application Ser. No. 07/438,199, filed Nov. 20, 1989, abandoned, which is a Continuation application of Ser. No. 07/274,393, filed Nov. 21, 1988, abandoned, which is a Continuation-in-part of application Ser. No. 07/060,639, filed June 11, 1987, abandoned.

BACKGROUND OF THE INVENTION

This invention relates to an improved cargo tray for vehicles, including automobiles, station wagons, vans or other vehicles having a cargo area that is carpeted or otherwise furnished in such a way that it is not suitable for cargo use and particularly for use with a rough cargo such as firewood for instance. The invention provides a cargo tray which is incrementally adjustable in length or width and is readily insertable or removable from the cargo area of a vehicle. The cargo tray is provided in two (2) interfitting and engaging parts so that the length or width of the cargo tray may be adjusted to accommodate the cargo area of the vehicle, or the cargo tray may be incrementally sized to fill as much of the cargo area as may be required to handle a particular load, and the two (2) parts of the tray will be locked together to form a single rigidly supported tray member.

Prior art cargo bed liners are not adapted to be adjustable incrementally in length or width to enable the use of one size cargo bed liner for a wide variety of vehicles with different shaped cargo areas or to utilize an appropriate or desired portion of a cargo area for a particular vehicle.

The improvements of the present invention beneficially provide a novel, non-obvious and useful cargo bed tray which is removable, incrementally adjustable in length or width will support itself in any incremental position without support from the sides of the vehicles cargo area and requires less storage space when not being used than the cargo liners of the prior art.

Yudenfreund in U.S. Pat. No. 2,898,146 discloses a foldable and removable insert and liner for the rear of station wagons and the like, the liner consisting of a plurality of hinged panels adapted to fit over the cargo deck and against the sides of the cargo area to shield and protect the interior of the vehicle.

Poyser in United Kingdom Patent application No. 2,118,109A discloses a protective liner for the load carrying area of a vehicle formed of side parts and an end part hingedly connected to a base part, whereby in a storage condition the parts are in a substantially flat configuration, and when in use the parts form an open ended container.

Kennedy in U.S. Pat. No. 818,257 discloses a lining for traction vehicles to facilitate the shipment of material in bulk, such as grain. The lining consists of four sections, each section having a bottom and two sides forming a corner. The sections being adjustable in size longitudinally or transversely by increasing or decreasing the amount of the overlap of the sections. The sections of Kennedy are placed against the sides of the cargo area for support, and cannot be used to line a portion of a cargo area.

Prior art cargo bed liners are not adapted to be adjustable incrementally in length or width to enable the use of one size cargo bed liner for a wide variety of vehicles with different shaped cargo areas or to utilize an appropriate portion of a cargo area for a particular vehicle. The improvements of the present invention beneficially provide a novel, non-obvious and useful cargo bed tray which is removable, incrementally adjustable in length or width and requires less storage space than those of the prior art.

BRIEF DESCRIPTION OF THE INVENTION

The problems of the prior art are overcome by the improved readily removable cargo area tray of the present invention. The cargo area tray of the invention is used in combination with a vehicle having a containment portion, such as an automobile with a trunk.

In some utility vehicles the containment portion is carpeted or is otherwise appointed for appearance and style, but not suitable for the rough use and abuse that the cargo areas were originally intended for. This invention is useful for the utility vehicle which is occasionally used as a cargo hauler and is normally used for personal transportation only. In these vehicles the cargo area tray of the invention is positioned within the containment portion over the carpeting and finished interior to protect it from damage during hard use. This invention is also useful in automobile trunks to protect them from damage during hard use.

The cargo area trays of the invention are preferably made of polymeric material, wood, metal or paper board material and the like. Examples of preferred polymeric materials are polypropylene and polystyrene.

In a preferred embodiment of the invention a first tray member is slid inwardly and outwardly over a second tray member to adjust the length of the tray. The first tray member has an engaging means such as an upwardly projecting ridges on the top surface of the tray. The second tray member has an engagable means such as at least one upwardly extending recess on the bottom surface of the tray. A series of spaced recesses will provide for the incremental adjustment of the size of the cargo tray by providing for the increment of the first and second tray members by the nesting relationship of the ridges and the recesses so that the first and second tray members can be held in position relative to each other. Cargo can be supported away from the sides of the cargo area of the vehicle.

An upwardly extending side extends around a portion of the perimeter of each of the tray members. At least a portion of the perimeter of each tray does not have a side, thus forming an open side. The open side of the first tray member is at least large enough to permit the second tray member to extend there through. The first side member at its upper end may terminate in an outwardly extending first flange. The second side member terminates in a second flange which extends outwardly and downwardly around the first flange in nesting relationship.

It is an object of the invention to provide a readily removable cargo area tray which is readily removable, is incrementally adjustable in length or width and is adapted for compact storage upon removal. The cargo area trays of the invention are adapted for temporary installation over carpeted areas, such as is found in automobile trunks and the cargo areas of vans, minivans and station wagons.

Another object of the invention is to provide an expandable readily removable cargo area tray which is adapted for compact storage upon removal. The cargo area trays of the invention are adapted for expandable temporary installation in the containment portion of a utility vehicle. This provides protection for the area of the containment portion while it is used for utility purposes.

BRIEF DESCRIPTION OF THE DRAWINGS

The objects, features and advantages of the present invention will become more fully apparent from the following detailed description of the preferred embodiments, the appended claims and the accompanying drawings in which:

FIG. 5 is a top view showing the cargo tray mounted transversely in the cargo area of a vehicle and locked in position to occupy the desired space.

FIG. 6 is a top view showing the cargo tray mounted longitudinally in the cargo area of a vehicle and locked in position to occupy the desired space.

FIG. 7 is a perspective view of a cargo tray according to the invention configured for use in the majority of current automobile trunks.

FIG. 10 is a cross sectional view taken along line 10—10 of FIG. 1 showing a portion of the first tray member in an incremental locked postion with the second tray member.

DETAILED DESCRIPTION OF THE PREFERRED EMBODIMENT

Figure 1:
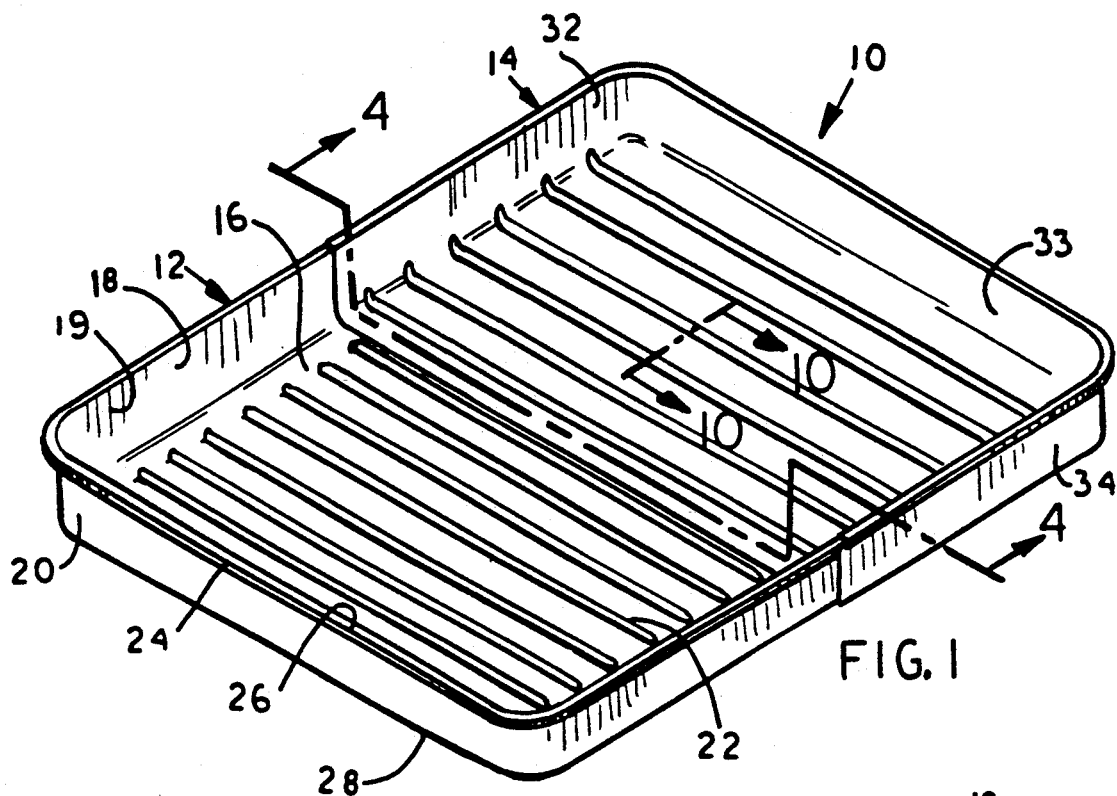
FIG. 1 is a perspective view of an incrementally adjustable and readily removable cargo tray in accordance with the invention showing the first tray member locked in an incremental position in the second tray member.
Figure 2:
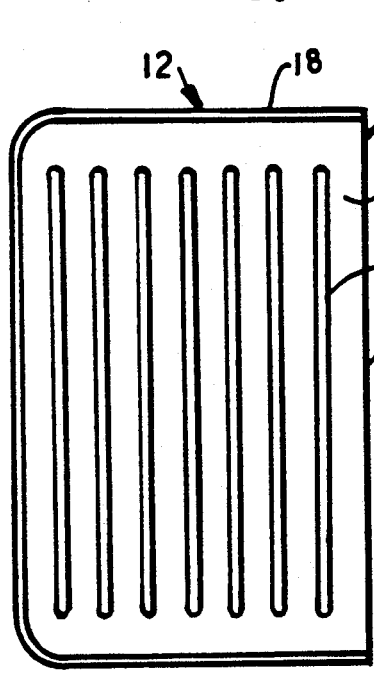
FIG. 2 is a top view of the first tray member in accordance with the invention.
Figure 3:
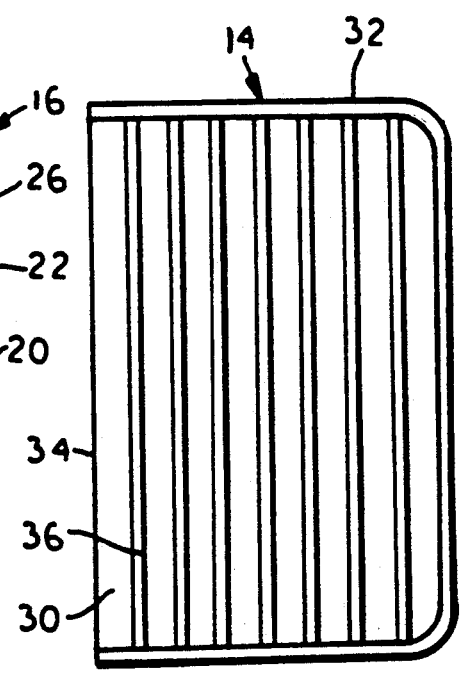
FIG. 3 is a top view of the second tray member in accordance with the invention.
Figure 4:
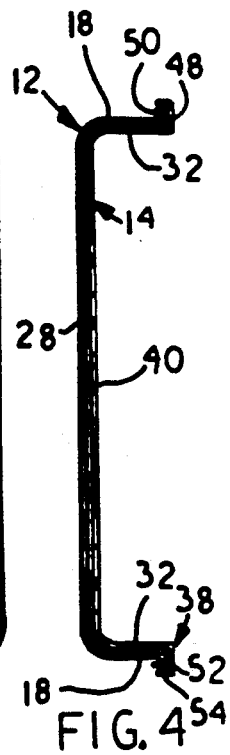
FIG. 4 is a cross sectional view taken along line 4—4 of FIG. 1 showing the first tray member in an incremental locked position with the second tray member.

The preferred embodiment of the present invention is illustrated by way of example in FIGS. 1 through 10. With specific reference to FIGS. 1 through 4, cargo tray 10 is made up of first tray member 12 and second tray member 14 which is adapted to nest at least partly inside first tray member 12. First tray member 12 is made up of first bottom member 16 and first side 18. First bottom member 16 is generally rectangular in shape and first side 18 extends upwardly therefrom along a portion of the periphery of first bottom member 16. First side 18 has first inner side 19 and first outer side 21. The remainder of the periphery of first tray member 12 forms first open side 20. First bottom member 16 has first top surface 26 and first bottom surface 28. First bottom member 16 has an engaging means which may be at least one ridge 22 extending upwardly from first top surface 26 and extending generally across first bottom member 16 in direction generally parallel to first open side 20. Additional spaced parallel ridges 22 may be provided across first bottom member 16.

Second tray member 14 is made up of second bottom member 30 and second side 32. Second bottom member 30 is generally rectangular in shape and second side 32 extends upwardly therefrom along a portion of the periphery of second bottom member 30. Second side 32 has second inner side 33 and second outer side 35. Second bottom member 30 has second top surface 40 and second bottom surface 42. Second bottom member 30 has an engagable means which may be at least one recess 36 extending upwardly from second bottom surface 42 and extending generally across second bottom member 30 in a direction generally parallel to second open side 34. Additional spaced parallel recesses 36 may be provided across second bottom member 30 to provide incremental adjustments to the size of cargo tray 10. The incremental positioning of first tray member 12 relative to second tray member 14 is accomplished by the nesting relationship of ridges 22 and recesses 36.

First side 18 terminates at first upper end 24 which may have a side engagable means consisting of first outwardly extending flange 48 and first downwardly extending flange 50. Second side 32 terminates in second upper end 38 which may have a side engaging means consisting of second outwardly extending flange 52 and second downwardly extending flange 54. Second upper end 38 extends around first upper end 24 in engaging relationship. First tray member 12 and second tray member 14 are locked in a selected position by an engaging means, such as ridges 22, and an engagable means, such as recesses 36, on first tray member 12 and second tray member 14 respectively, and by engaged portions of first upper end 24 and second upper end 38.

Figure 8:
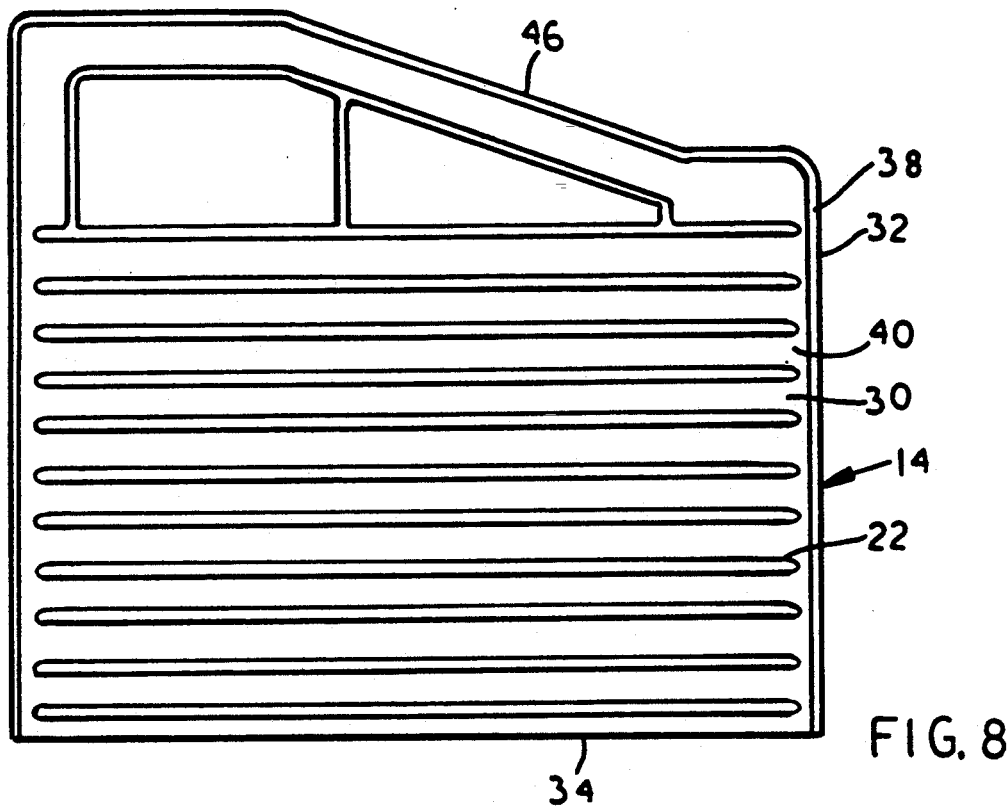
FIG. 8 is a top view of the first tray member in accordance with the invention configured for use in the majority of current automobile trunks.
Figure 9:
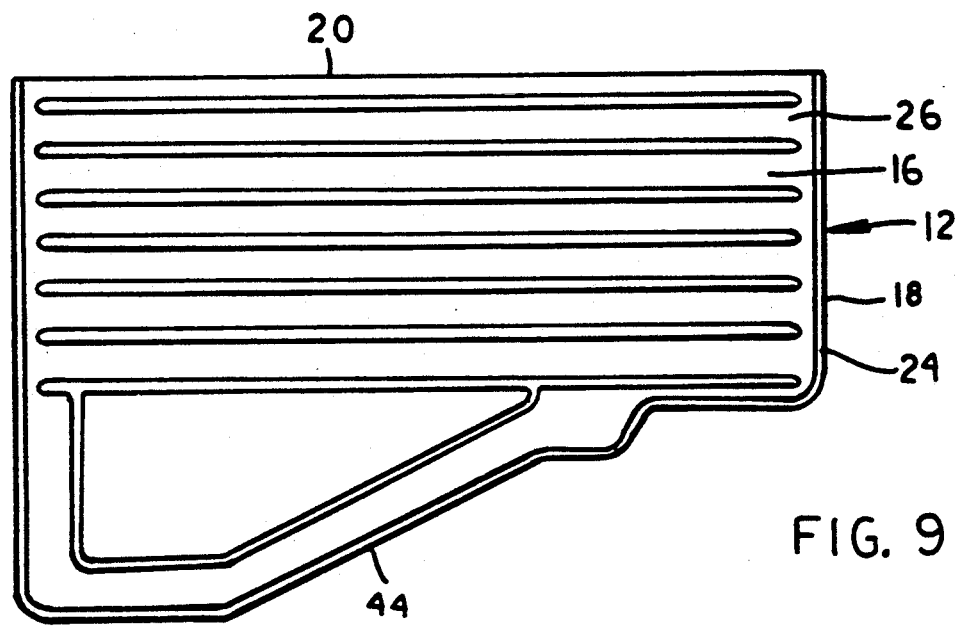
FIG. 9 is a top view of the second tray member in accordance with the invention configured for use in the majority of current automobile trunks.

In the embodiment shown in FIGS. 7 through 9, the shape of first tray member 12 and second tray member 14 has been modified to fit to the fullest extent as possible the trunks of most current production automobiles. While the generally rectangular shape is maintained, first outer end 44 of first side 18 and second outer end 46 of second side 32 of cargo tray 10, as oriented in an automobile are configured inwardly to avoid wheel wells, gasoline fill pipes and other common trunk obstacles.

Second tray member 14, as shown in FIG. 8, may also be modified for a particular trunk. Bottom member 14 may be provided with a greater length than bottom member 12, as shown in FIG. 9. The largest automobile trunks may be filled with this cargo tray. To fit very small trunks, second tray member 14 may be shortened by cutting off second tray member 14 along second open side 34. Thus, the broadest possible range of trunks can be fit by a single model of cargo tray 10.

FIG. 5 shows cargo tray 10 adjustable from side to side in the cargo area of a vehicle. FIG. 6 shows cargo tray 10 adjustable lengthwise in the cargo area of a vehicle.

While the present invention has been disclosed in connection with the preferred embodiment thereof, it should be understood that there may be other embodiments which fall within the spirit and scope of the invention as defined by the following claims.

What is claimed is:

1. An adjustable cargo tray for use in a cargo area of a vehicle comprising:
    a first tray member and a second tray member,
    said first tray member comprising a generally rectangular first bottom member and an integral first side extending upwardly from said first bottom member along a portion of the periphery thereof, said first bottom member having a first top surface and a first bottom surface, said first side having a first inner side and a first outer side, said first bottom member and said first side member forming a rigid tray having a first open side, said second tray member comprising a generally rectangular second bottom member and an integral second side extending upwardly from said second bottom member along a portion of the periphery thereof, said second bottom member having a second top surface and a second bottom surface, said second side having a second inner side, said second bottom member and second side forming a rigid tray having a second open side, said first tray member and said first top surface of said first bottom member and said first inner side of said first side being complimentary in shape and adapted to receive at least a portion of said second tray member, said second tray member and said second bottom member of said second bottom member and second outer end of said second side being complimentary in shape and adapted to be received in at least a portion of said first tray member, an engaging means on said first top surface of said first bottom member of said first tray member, an engagable means on said second bottom surface of said second bottom member of said second tray member whereby said second tray member may be adjustably positioned on said first tray member and said engaging means and said engagable means being adapted to hold said first and said second tray members in a fixed position with respect to each other, said engaging means comprises a ridge on said first top surface of said first bottom member extending generally parallel to said first open side of said first tray member, said engagable means comprises a recess in said second bottom surface of said second bottom member substantially complimentary in shape to said ridge, said recess extending generally parallel to said second open side of said second tray member, said second tray member being positionable relative to said first tray member, said ridge on said first bottom member being adapted to engage said recess on said second bottom member whereby said first and said second tray members are supported in a load carrying position.

2. The cargo tray as recited in claim 1 wherein said engagable means comprises a series of parallel spaced recesses, each said recess extending across said second bottom surface of said second bottom member parallel to said second open side of said second tray member whereby said first and second tray members may be incrementally adjusted to a desired size by positioning the appropriate said recess over said ridge.

3. The cargo tray as recited in claim 1 wherein said engagable means further comprises a series of parallel spaced ridges, each said ridge extending across said first top surface of said first bottom member parallel to said fist open side of said first tray member whereby said first and second tray members may be incrementally adjusted to a desired size by positioning the appropriate said recesses over said ridges.

4. The cargo tray as recited in claim 1 wherein said recess further comprises a series of parallel spaced recesses, each said recesses extending across said second bottom surface of said second bottom member parallel to said second open side of said second tray member whereby said first and said second tray members may be incrementally adjusted to a desired size by engaging said ridge in the appropriate recess.

5. The cargo tray as recited in claim 2 wherein said ridge further comprises a series of spaced ridges, each said ridge extending across said top surface of said first bottom member parallel to said open end of said first tray member whereby said first and second tray members may be incrementally adjusted to a desired size by positioning the appropriate said grooves over the appropriate said ridges.

6. The cargo tray as recited in claim 1 further comprising an outwardly extending flange integrally attached to a first upper end of said first side of said first tray member.

7. The cargo tray as recited in claim 1 further comprising an outwardly extending flange integrally attached to a second upper end of said second side of said second tray member.

8. The cargo tray as recited in claim 1 further comprising a side engaging means at said upper end of said second side and a side engagable means at said upper end of said first side member, said side engaging means being adapted to engage said side engagable means and hold said first and second tray members in a fixed position with respect to each other.

9. The cargo tray as recited in claim 1 wherein said tray is made of polymeric material.

10. The cargo tray as recited in claim 1 wherein the size of said cargo tray may be altered by removing material along said first open side.

* * * * *